United States Patent [19]

Carlson

[11] 4,290,917
[45] * Sep. 22, 1981

[54] METHOD OF MANUFACTURING A CATALYTIC COMPOSITE

[75] Inventor: David H. J. Carlson, Park Ridge, Ill.

[73] Assignee: UOP Inc., Des Plaines, Ill.

[*] Notice: The portion of the term of this patent subsequent to Jun. 30, 1998, has been disclaimed.

[21] Appl. No.: 111,757

[22] Filed: Jan. 14, 1980

Related U.S. Application Data

[63] Continuation-in-part of Ser. No. 80,638, Oct. 1, 1979.

[51] Int. Cl.³ .............................................. B01J 31/22
[52] U.S. Cl. .............................. 252/430; 252/431 N; 208/206; 208/207
[58] Field of Search .................... 252/428, 430, 431 N

[56] References Cited

U.S. PATENT DOCUMENTS

| 4,124,493 | 11/1978 | Frame | 252/431 N X |
| 4,157,312 | 6/1979 | Frame | 252/431 N X |
| 4,206,079 | 6/1980 | Frame | 252/431 N X |

Primary Examiner—Patrick Garvin
Attorney, Agent, or Firm—James R. Hoatson, Jr.; Gregory J. Mancuso; William H. Page, II

[57] ABSTRACT

Disclosed is a method of preparing a catalytic composite useful in the treatment of sour mercaptan-containing petroleum distillates. More specifically, the method of preparation comprises contacting an adsorptive support with a substituted ammonium hydroxide, drying the resulting composite, thereafter contacting the resulting composite with an alkali metal hydroxide and a metal chelate, the alkali metal hydroxide being in a weight ratio with the adsorptive support of from about 0.1:1 to about 1:1, and thereafter drying the resulting catalytic composite.

12 Claims, No Drawings

METHOD OF MANUFACTURING A CATALYTIC COMPOSITE

BACKGROUND OF THE INVENTION

Cross-Reference to Related Application

This application is a continuation-in-part of a copending application Ser. No. 080,638, filed on Oct. 1, 1979, said application incorporated herein by reference thereto.

FIELD OF THE INVENTION

The field of art to which the claimed invention pertains is methods of manufacturing catalytic composites. More specifically, the claimed invention relates to a method of manufacturing especially useful for the treatment of sour petroleum distillates to effect the oxidation of mercaptans in the distillate to disulfides.

DESCRIPTION OF THE PRIOR ART

Processes for the treatment of sour petroleum distillates wherein the distillate is treated in contact with an oxidation catalyst in the presence of an oxidizing agent at alkaline reaction conditions have become well known and widely practiced in the petroleum refining industry. Said processes are typically designed to effect the oxidation of offensive mercaptans contained in a sour petroleum distillate with the formation of innocuous disulfides—a process commonly referred to as sweetening. The oxidizing agent is most often air. Gasoline, including natural, straight run and cracked gasolines, is the most frequently treated sour petroleum distillate. Other sour petroleum distillates include the normally gaseous petroleum fraction as well as naphtha, kerosene, jet fuel, fuel oil, lube oil, and the like.

A commonly used continuous process for treating sour petroleum distillates entails treating the distillate in contact with a metal phthalocyanine catalyst dispersed in an aqueous caustic solution to yield a doctor sweet product. The sour distillate and the catalyst-containing aqueous caustic solution provide a liquid-liquid system wherein mercaptans are converted to disulfides at the interface of the immiscible solutions in the presence of an oxidizing agent—usually air. Sour petroleum distillates containing more difficultly oxidizable mercaptans are more effectively treated in contact with a metal chelate catalyst disposed on a high surface area adsorptive support—usually a metal phthalocyanine on an activated charcoal. The distillate is treated in contact with the supported metal chelate catalyst at oxidation conditions in the presence of an alkaline agent. One such process is described in U.S. Pat. No. 2,988,500. The oxidizing agent is most often air admixed with the distillate to be treated, and the alkaline agent is most often an aqueous caustic solution charged continuously to the process or intermittently as required to maintain the catalyst in a caustic-wetted state.

Heretofore, the practice of catalytically treating mercaptan-containing sour petroleum distillates has involved the introduction of alkaline agents, usually sodium hydroxide, into the sour petroleum distillate prior to or during the treating operation. (U.S. Pat. No. 3,108,081, U.S. Pat. No. 4,156,641.) The prior art also suggests the addition to the petroleum distillate along with certain alkaline agents of certain non-alkaline additives. (U.S. Pat. No. 4,124,493, U.S. Pat. No. 4,033,860.) In addition, the prior art suggests the use in an alkaline environment of certain catalytic composites produced from metal phthalocyanine solutions containing certain non-alkaline additives. (U.S. Pat. No. 4,157,312, U.S. Pat. No. 4,124,531.) The prior art also discloses the use of alkanolamine hydroxide in the preparation of catalysts comprising a metal chelate on an adsorptive support (U.S. Pat. No. 4,124,494, U.S. Pat. No. 4,159,964). Finally, the prior art suggests the use of certain chemicals, including sodium hydroxide, to increase the solubility of metal phthalocyanine in aqueous solutions from which metal phthalocyanine catalysts to be used in alkaline environments are made. (U.S. Pat. No. 3,108,081.)

What has been needed is a method of preparing a catalytic composite of sufficient activity that addition to the petroleum distillate of an alkaline agent is not required for satisfactory treating of the distillate. The method of this invention can be used to prepare a catalytic composite useful in the treating of sour mercaptan-containing petroleum distillate with or without the necessity of addition of an alkaline agent. The consequent savings in materials handling and storage expenses, and avoidance of use of hazardous alkaline chemicals in the treating process, have been long desired.

SUMMARY OF THE INVENTION

It is a broad objective of my invention to produce a novel method of preparing a catalytic composite useful for treating a mercaptan-containing petroleum distillate.

In brief summary, I have found that a catalyst especially useful in the treatment of sour petroleum distillates or fractions may be prepared by contacting an adsorptive support with a substituted ammonium compound represented by the structural formula:

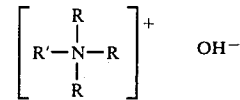

wherein R is a hydrocarbon radical containing up to about 20 carbon atoms and selected from the group consisting of alkyl, cycloalkyl, aryl, alkaryl and aralkyl and R' is a substantially straight-chain alkyl radical containing from about 5 to about 20 carbon atoms, drying the resulting composite, thereafter contacting the resulting composite with an alkali metal hydroxide and with a metal chelate, said alkali metal hydroxide being in a weight ratio with said adsorptive support of from about 0.1:1 to about 1:1; and thereafter drying the resulting catalytic composite.

Other objects and embodiments of this invention will become apparent in the following detailed description.

DESCRIPTION OF THE INVENTION

Any of the hydroxides of the metals of Group I-A of the Periodic Chart—the alkali metal hydroxides—can be used as a component of this invention. The alkali metal hydroxide component of this invention can be a single alkali metal hydroxide, or a mixture of two or more alkali metal hydroxides. The preferred alkali metal hydroxide for use in this invention is sodium hydroxide. Potassium hydroxide is also preferred. The alkali metal hydroxides are widely available commercially. They may be made by the electrolysis of aqueous alkali-salt solutions, usually the chloride salt, or by the hydration of alkali metal hydrides.

The metal chelate employed in the practice of this invention can be any of the various metal chelates known to the treating art as effective to catalyze the oxidation of mercaptans contained in a sour petroleum distillate with the formation of polysulfide oxidation products. Said metal chelates include the metal compounds of tetrapyridinoporphyrazine described in U.S. Pat. No. 3,980,582, e.g. cobalt tetrapyridinoporphyrazine; porphyrin and metaloporphyrin catalysts as described in U.S. Pat. No. 2,966,453, e.g. cobalt tetraphenylporphyrin sulfonate; corrinoid catalysts as described in U.S. Pat. No. 3,252,892, e.g. cobalt corrin sulfonate; chelate organometallic catalysts such as described in U.S. Pat. No. 2,918,426, e.g. the condensation product of an aminophenol and a metal of Group VIII; and the like. Metal phthalocyanines are a preferred class of metal chelates.

The metal phthalocyanines which can be employed to catalyze the oxidation of mercaptans generally include magnesium phthalocyanine, titanium phthalocyanine, hafnium phthalocyanine, vanadium phthalocyanine, tantalum phthalocyanine, molybdenum phthalocyanine, manganese phthalocyanine, iron phthalocyanine, cobalt phthalocyanine, nickel phthalocyanine, platinum phthalocyanine, palladium phthalocyanine, copper phthalocyanine, silver phthalocyanine, zinc phthalocyanine, tin phthalocyanine and the like. Cobalt phthalocyanine and vanadium phthalocyanine are particularly preferred. The metal phthalocyanine is most frequently employed as a derivative thereof, the commercially available sulfonated derivatives, e.g. cobalt phthalocyanine monosulfonate, cobalt phthalocyanine disulfonate or a mixture thereof being particularly preferred. The sulfonated derivatives may be prepared, for example, by reacting cobalt, vanadium or other metal phthalocyanine with fuming sulfuric acid. While the sulfonated derivatives are preferred, it is understood that other derivatives, particularly the carboxylated derivatives, may be employed. The carboxylated derivatives are readily prepared by the action of trichloroacetic acid on the metal phthalocyanine.

The adsorbent support employed herein can be any of the well-known adsorbent materials generally utilized as catalyst support or carrier material. Preferred adsorbent materials include the various charcoals produced by the destructive distillation of wood, peat, lignite, nutshells, bones, and other carbonaceous matter, and preferably such charcoals as have been heat treated or chemically treated or both, to form a highly porous particle structure of increased adsorbent capacity, and generally defined as activated carbon or charcoal. Said adsorbent materials also include the naturally occurring clays and silicates, e.g. diatomaceous earth, fuller's earth, kieselguhr, attapulgus clay, feldspar, montmorillonite, haloysite, kaolin, and the like, and also the naturally occurring or synthetically prepared refractory inorganic oxides such as alumina, silica, zirconia, thoria, boria, etc., or combinations thereof like silica-alumina, silica-zirconia, alumina-zirconia, etc. Any particular adsorbent material is selected with regard to its stability under conditions of its intended use. For example, in the treatment of a sour petroleum distillate, the adsorbent support should be insoluble in, and otherwise inert to, the petroleum distillate at the alkaline reaction conditions existing in the treating zone. Charcoal, and particularly, activated charcoal, is preferred because of its capacity for metal phthalocyanine, and because of its stability under treating conditions. The adsorbent support can be in the form of spheres, pellets, granules, or other particles of uniform or irregular size or shape.

The substituted ammonium compound component of the catalytic composite of this invention is represented by the structural formula:

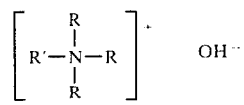

wherein R is a hydrocarbon radical containing up to about 20 carbon atoms and selected from the group consisting of alkyl, cycloalkyl, aryl, alkaryl and aralkyl and R' is a substantially straight-chain alkyl radical containing from about 5 to about 20 carbon atoms. It is preferred that one R radical be an alkyl radical containing from about 12 to about 18 carbon atoms, and another R radical be a benzyl radical. The preferred substituted ammonium compound is dimethylbenzylalkylammonium hydroxide, including benzyldimethyldodecylammonium hydroxide, benzyldimethyltetradecylammonium hydroxide, benzyldimethylhexadecylammonium hydroxide, benzyldimethyloctadecylammonium hydroxide, and the like. Other suitable substituted ammonium compounds include dimethylcyclohexyloctylammonium hydroxide, diethylcyclohexyloctylammonium hydroxide, dipropylcyclohexyloctylammonium hydroxide, dimethylcyclohexyldecylammonium hydroxide, diethylcyclohexyldecylammonium hydroxide, dipropylcyclohexyldecylammonium hydroxide, dimethylcyclohexyldodecylammonium hydroxide, diethylcyclohexyldodecylammonium hydroxide, dipropylcyclohexyldodecylammonium hydroxide, dimethylcyclohexyltetradecylammonium hydroxide, diethylcyclohexyltetradecylammonium hydroxide, dipropylcyclohexyltetradecylammonium hydroxide, dimethylcyclohexylhexadecylammonium hydroxide, diethylcyclohexylhexadecylammonium hydroxide, dipropylcyclohexylhexadecylammonium hydroxide, dimethylcyclohexyloctadecylammonium hydroxide, diethylcyclohexyloctadecylammonium hydroxide, dipropylcyclohexyloctadecylammonium hydroxide, and the like. Other suitable substituted ammonium compounds are described in U.S. Pat. No. 4,156,641.

The method of preparation of this invention comprises a stepwise process of first disposing a substituted ammonium compound on an adsorptive support, drying the resulting composite, thereafter contacting the resulting composite with a metal chelate and an alkali metal hydroxide, and thereafter drying the resulting catalytic composite. The alkali metal hydroxide, substituted ammonium compound, and metal chelate are readily disposed on the adsorbent support, and each can be disposed on the adsorbent support in any conventional or otherwise convenient manner.

The substituted ammonium compound can be contacted with the adsorptive support by soaking, suspending, dipping one or more times, or otherwise immersing the adsorptive support in a solution of the substituted ammonium compound. One preferred method involves the use of a steam-jacketed rotary dryer. The adsorbent support is immersed in an aqueous solution of the substituted ammonium compound contained in the rotary dryer and the adsorptive support is tumbled therein by the rotary motion of the dryer.

The composite of the adsorptive support and the substituted ammonium compound is dried prior to the second contacting step of this invention. Drying can be effected by applying steam to the dryer jacket. The composite can be dried under ambient temperature conditions, or at an elevated temperature in an oven, or in a flow of hot gases, or in any other suitable manner.

An alternative and convenient method for contacting substituted ammonium compounds with the adsorptive support comprises predisposing the adsorptive support in a sour petroleum distillate treating zone or chamber as a fixed bed and passing the substituted ammonium compound through the bed in order to contact the substituted ammonium compound with the adsorptive support in situ. This method allows the substituted ammonium compound to be recycled one or more times to achieve a desired concentration of substituted ammonium compound on the adsorptive support. In still another alternate method, the adsorptive support can be predisposed in the treating zone or chamber, and the zone or chamber thereafter filled with the substituted ammonium compound to soak the adsorptive support for a predetermined period. In any event, a contact time of at least 60 minutes is preferred.

After having contacted the adsorptive support with the substituted ammonium compound and drying the resulting composite, the metal chelate and the alkali metal hydroxide can be contacted with the adsorptive support in exactly the same manner as the substituted ammonium compound was contacted with the adsorptive support. It is preferred for convenience to use the same method for contacting the adsorptive support with the substituted ammonium compound, the alkali metal hydroxide, and the metal chelate. Use of a steam-jacketed rotary dryer as discussed above is especially preferred.

The metal chelate and the alkali metal hydroxide may be contacted with the adsorptive support simultaneously from a common aqueous solution and/or dispersion thereof, or separately in any desired sequence. It is preferred that the alkali metal hydroxide be in a weight ratio with the adsorptive support of from about 0.1:1 to about 1:1. It is especially preferred that the alkali metal hydroxide be in a weight ratio with the adsorptive support of from about 0.3:1 to about 0.5:1, and that the substituted ammonium compound be in a weight ratio with the adsorptive support of from about 0.1:1 to about 0.3:1.

In the process of sweetening a sour petroleum distillate, it has heretofore been the practice to oxidize the mercaptans contained therein in the presence of an alkaline agent. With respect to catalytic composites manufactured by the method of this invention, those distillates containing the more readily oxidized mercaptans can be treated in the absence of added alkaline agent. A sour petroleum distillate is passed in contact with the catalytic composite manufactured by the method of this invention. The catalytic composite can be dispersed within the distillate, or it can be disposed as a fixed bed in a container. The contacting can be batch-type, or continuous. A continuous treating operation using a fixed bed of the catalytic composite is preferred. An oxidizing agent, preferably air, is introduced to contact the distillate and the catalytic composite to provide at least the stoichiometric amount of oxygen required to oxidize the mercaptan content of the distillate. It may be preferable in treating distillates with high mercaptan content to contact the catalytic composite with an alkaline agent prior to contacting the distillate and the catalytic composite with each other.

Treatment of sour petroleum distillates in contact with the catalytic composite manufactured by the method of this invention can be performed in the presence of an alkaline agent as heretofore practiced, if desired. The catalytic composite is initially saturated with an alkaline agent, and an alkaline agent thereafter passed in contact with the catalyst bed, continuously or intermittently as required, admixed with the sour petroleum distillate. Any suitable alkaline agent may be employed. An alkali metal hydroxide in aqueous solution, e.g. sodium hydroxide in aqueous solution, is most often employed. The solution may further comprise a solubilizer to promote mercaptan solubility, e.g. alcohol, and especially methanol, ethanol, n-propanol, isopropanol, etc., and also phenols, cresols, and the like. A particularly preferred alkaline agent is an aqueous caustic solution comprising from about 2 to about 30 wt. % sodium hydroxide. The solubilizer, when employed, is preferably methanol, and the alkaline solution may suitably comprise from about 2 to about 100 vol. % thereof. Sodium hydroxide and potassium hydroxide constitute the preferred alkaline agents. Others including lithium hydroxide, rubidium hydroxide and cesium hydroxide are also suitably employed.

The method of treating a sour petroleum distillate can be effected in accordance with prior art treating conditions. The process is usually effected at ambient temperature conditions, although higher temperatures up to about 105° C. are suitably employed. Pressures of up to about 1,000 psi or more are operable, although atmospheric or substantially atmospheric pressures are entirely suitable. Contact times equivalent to a liquid hourly space velocity of from about 0.5 to about 10 or more are effective to achieve a desired reduction in the mercaptan content of a sour petroleum distillate, an optimum contact time being dependent on the size of the treating zone, the quantity of catalyst contained therein, and the character of the distillate being treated.

As previously stated, sweetening of the sour petroleum distillate is effected by oxidizing the mercaptan content thereof to disulfides. Accordingly, the process is effected in the presence of an oxidizing agent, preferably air, although oxygen or other oxygen-containing gas may be employed. In fixed bed treating operations, the sour petroleum distillate may be passed upwardly or downwardly through the catalytic composite. The sour petroleum distillate may contain sufficient entrained air, but generally added air is admixed with the distillate and charged to the treating zone concurrently therewith. In some cases, it may be of advantage to charge the air separately to the treating zone and countercurrent to the distillate separately charged thereto.

As heretofore mentioned, the substituted ammonium compound, alkali metal hydroxide and metal chelate components of the catalytic composite manufactured by the method of this invention are readily adsorbed on the adsorbent support. Thus, any of the said components which may in time be leached from the support and carried away in the reactant stream can be easily restored to the catalytic composite in situ by introducing either or any of said components to the sweetening process, for example, in admixture with the distillate being treated to be disposed on the solid adsorbent support in the treating zone.

The following examples are presented in illustration of certain preferred embodiments of this invention and are not intended as undue limitations on the generally broad scope of the invention as set out in the appended claims.

EXAMPLE I

In this example, an activated charcoal supported cobalt phthalocyanine monosulfonate catalyst is prepared in accordance with prior art practice by adsorbing the cobalt phthalocyanine monosulfonate on the activated charcoal support from a methanolic dispersion thereof. Thus, 150 mg. of cobalt phthalocyanine monosulfonate is admixed with 50 ml. of methanol and stirred for about 5 minutes. The resulting dispersion is then further diluted to 300 ml. with methanol with an additional 5 minutes of stirring. About 100 cc. of the activated charcoal particles, having an average bulk density of about 0.25 gm/cc and a particle size in the 10×30 mesh range, are immersed in the methanol dispersion, and the dispersion is stirred in contact with the particles for about 5 minutes and then maintained in contact with the particles for 1 hour under quiescent conditions. The methanolic dispersion is thereafter evaporated to dryness over a steam bath in contact with the charcoal particles, and the resulting impregnated particles are subsequently oven dried at 100° C. for 1 hour.

EXAMPLE II

This example illustrates one embodiment of this invention. About 100 cc. of clean, dry activated charcoal particles are admixed with 10 gms. of a 50% alcoholic solution of dimethylbenzylalkylammonium hydroxide. The benzyldimethylalkylammonium hydroxide is preferably benzyldimethyldodecylammonium hydroxide, benzyldimethyltetradecylammonium hydroxide, benzyldimethylhexadecylammonium hydroxide, and/or benzyldimethyloctadecylammonium hydroxide. The charcoal particles have an average bulk density of about 0.25 gm/cc and a particle size in the 10×30 mesh range. The charcoal particles are maintained in contact with the substituted ammonium hydroxide for approximately 60 minutes. The admixture is thereafter evaporated to dryness over a steam bath to form a composite. Thereafter, a mixture of 150 mg. of cobalt phthalocyanine monosulfonate and 150 ml. of 7 wt. % aqueous sodium hydroxide is admixed with the aforesaid composite. The composite is maintained in contact with the aforesaid mixture for approximately 60 minutes. The resulting admixture is thereafter evaporated to dryness over a steam bath.

EXAMPLE III

A comparative evaluation of the catalytic composites of the foregoing Example I and Example II is effected in the following manner. In each case, 100 cc. of the catalyst is disposed as a fixed bed in a vertical glass tubular reactor maintained at ambient temperature conditions—about 80° to 85° F. Air is charged to the system through a rotameter at about 200 cc. per hour and admixed with a sour kerosene feedstock containing about 1,000 ppm. mercaptan sulfur. The mixture is processed downwardly through the catalyst bed at a liquid hourly space velocity of about 1 over a 20 hour period. The reactor effluent is monitored and analyzed periodically for mercaptan sulfur.

It is expected that the catalytic composite of Example I would reduce the mercaptan sulfur level of the treated petroleum distillate to approximately 50% of the mercaptan sulfur level of the untreated feedstock. It is also expected that the catalytic composite of Example II produced by the method of this invention would reduce the mercaptan sulfur level of the treated petroleum distillate to approximately 5% of the mercaptan sulfur level of the untreated feedstock.

I claim as my invention:

1. A method of manufacture of a catalytic composite which comprises contacting an adsorptive support with a substituted ammonium compound represented by the structural formula:

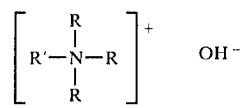

wherein R is a hydrocarbon radical containing up to about 20 carbon atoms and selected from the group consisting of alkyl, cycloalkyl, aryl, alkaryl and aralkyl and R' is a substantially straight-chain alkyl radical containing from about 5 to about 20 carbon atoms, drying the resulting composite, thereafter contacting the resulting composite with a metal chelate and with an alkali metal hydroxide, said alkali metal hydroxide being in a weight ratio with said adsorptive support from about 0.1:1 to about 1:1, and thereafter drying the resulting catalytic composite.

2. The method of claim 1 wherein one R radical is an alkyl radical containing from about 12 to about 18 carbon atoms and another R radical is a benzyl radical.

3. The method of claim 1 wherein said alkali metal hydroxide is in a weight ratio with said adsorptive support of from about 0.3:1 to about 0.5:1.

4. The method of claim 1 wherein said alkali metal hydroxide is in a weight ratio with said adsorptive support of from about 0.3:1 to about 0.5:1 and said substituted ammonium compound is in a weight ratio with said adsorptive support of from about 0.1:1 to about 0.3:1.

5. The method of claim 1 wherein said alkali metal hydroxide is sodium hydroxide.

6. The method of claim 1 wherein said alkali metal hydroxide is potassium hydroxide.

7. The method of claim 1 wherein said substituted ammonium compound is dimethylbenzylalkylammonium hydroxide.

8. The method of claim 1 wherein said adsorptive support is an activated charcoal.

9. The method of claim 1 wherein said metal chelate is a metal phthalocyanine.

10. The method of claim 1 wherein said metal chelate is a cobalt phthalocyanine.

11. The method of claim 1 wherein said metal chelate is a vanadium phthalocyanine.

12. The method of claim 1 wherein said metal chelate is cobalt phthalocyanine monosulfonate.

* * * * *